United States Patent [19]

Stark

[11] Patent Number: 5,935,210
[45] Date of Patent: Aug. 10, 1999

[54] MAPPING THE STRUCTURE OF A COLLECTION OF COMPUTER RESOURCES

[75] Inventor: Randall J. Stark, Bellevue, Wash.

[73] Assignee: Microsoft Corporation, Redmond, Wash.

[21] Appl. No.: 08/753,619

[22] Filed: Nov. 27, 1996

[51] Int. Cl.[6] .................................................. G06F 17/00
[52] U.S. Cl. ........................................................ 709/224
[58] Field of Search ........................ 395/200.54, 200.31; 707/203, 513, 511

[56] References Cited

U.S. PATENT DOCUMENTS

| | | |
|---|---|---|
| 4,914,571 | 4/1990 | Baratz et al. . |
| 5,136,690 | 8/1992 | Becker et al. . |
| 5,185,860 | 2/1993 | Wu . |
| 5,270,919 | 12/1993 | Blake et al. . |
| 5,276,789 | 1/1994 | Besaw et al. . |
| 5,500,934 | 3/1996 | Austin et al. . |
| 5,687,367 | 11/1997 | Dockter et al. ......................... 707/513 |
| 5,752,022 | 5/1998 | Chiu et al. .............................. 707/511 |

OTHER PUBLICATIONS

Ashman et al.; "Link Management Within a Geographic Hypermedia Information System"; 1993 Australian Conference on Information Systems 1993.

Hill et al.; "Applying OPen Hypertext Prinicples to the WWW"; Multimedia Research Group, 1995.

*Primary Examiner*—Ellis B. Ramirez
*Attorney, Agent, or Firm*—Klarquist Sparkman Campbell Leigh & Whinston LLP

[57] ABSTRACT

A computer-implemented method of gathering information about a site of resources in a computer system includes the steps of retrieving a first one of the resources from the site; extracting from the first resource information about embedded hyperlinks to other resources in the site; extracting from the first resource meta-data describing aspects of the first resource and the other resources; and storing in a self-contained persistent data store the information about the hyperlinks and the meta-data.

37 Claims, 13 Drawing Sheets

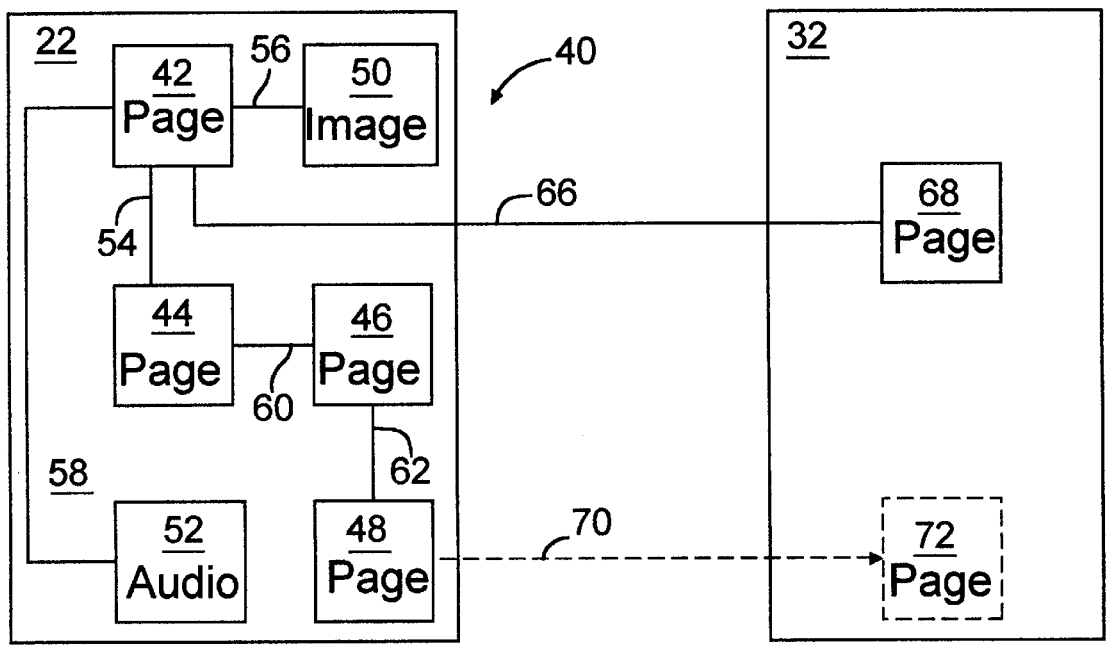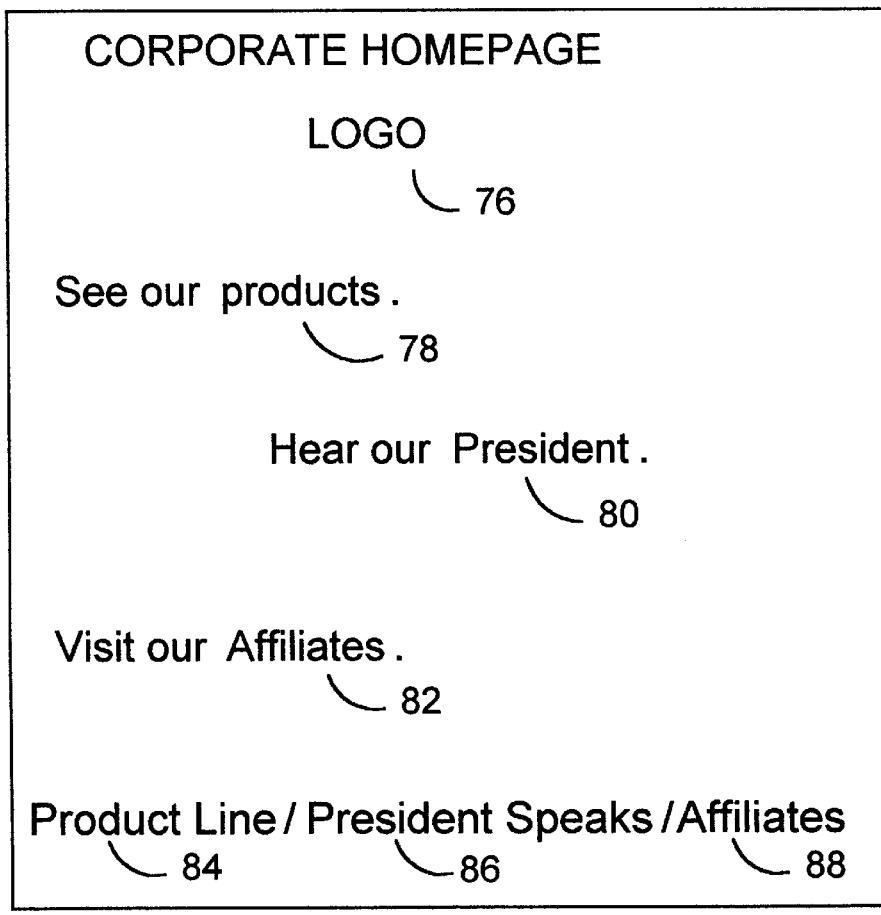
FIG. 2

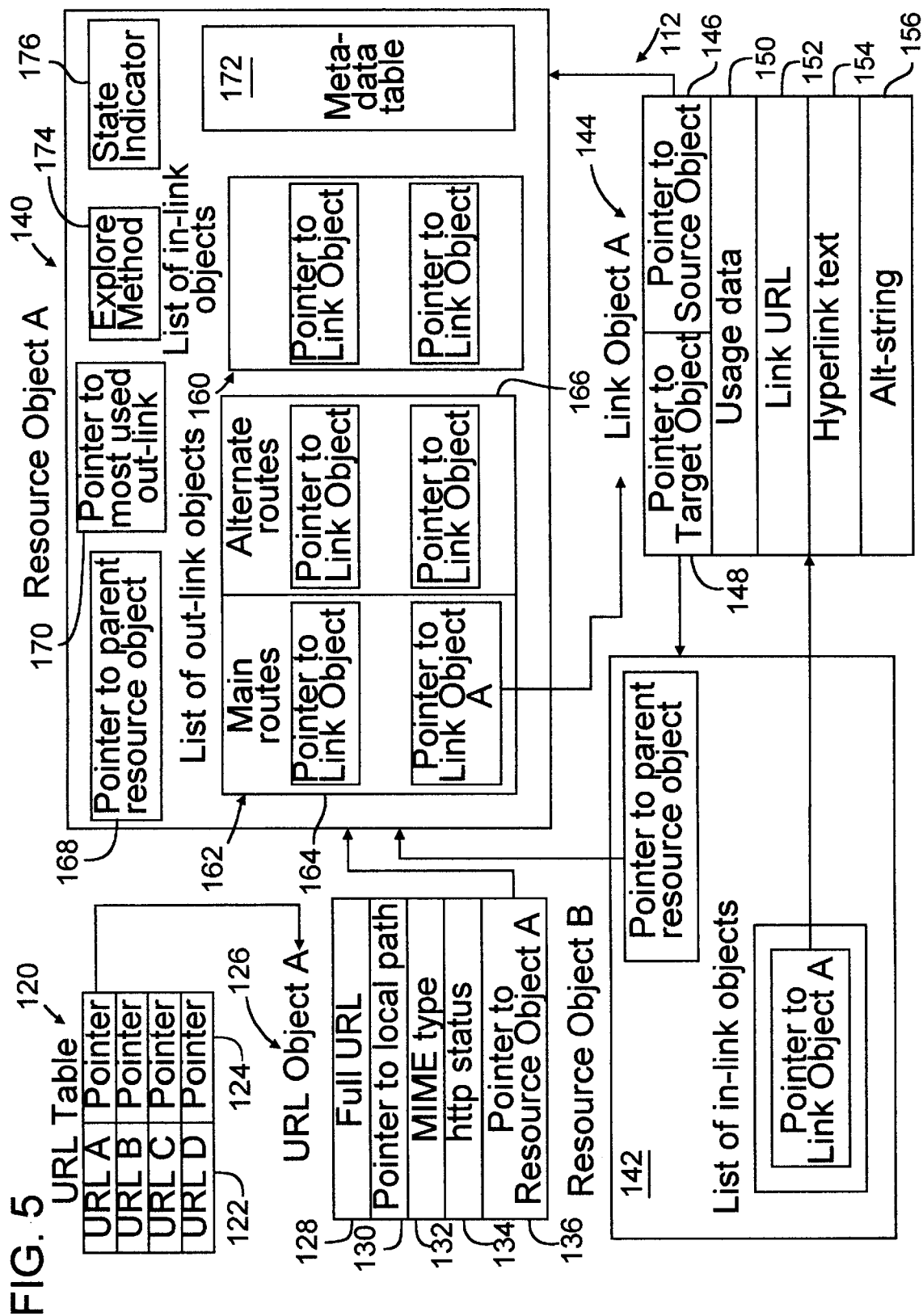

MAPPING THE STRUCTURE OF A COLLECTION OF COMPUTER RESOURCES

BACKGROUND

The invention relates to mapping the structure of a collection of resources in a computer system.

The rapid growth in the popularity and accessibility of the Internet has led to an explosion in the amount and types of information available by computer. Seemingly every business and interest group maintains a World Wide Web site to provide information and/or entertainment for Internet users. Each Web site typically is a collection of computer resources, such as executable programs, HTML pages, JPEG and GIF image files, audio and video files, gateways, and service applications (e.g., electronic mail, file transfer protocol (FTP), news, gopher, telnet, and WAIS), maintained by one or more server computers.

The organization of information in a Web site is determined by the hyperlink structure of the resources contained in the site. For example, a site typically includes a top-level resource, or "home page", containing hyperlinks to other resources, which in turn typically contain hyperlinks to other resources. Each hyperlink typically consists of the Uniform Resource Locator (URL) of the corresponding resource and is presented to the user as a graphical object (e.g., a piece of text or an image). To access a particular resource in the site, a user must enter the site through the home page and navigate through a maze of hyperlinks, selecting the corresponding graphical objects until the desired resource is found. Typically, this navigation requires the assistance of an Internet service provider (ISP) or on-line service provider (OSP), the cost of which is determined by the amount of time the user accesses the service.

The administrator of a Web site also must navigate through the site to ensure the integrity of the site. For example, the site administrator generally can find a broken link (e.g., a link to a resource that no longer exists or has changed locations) only by unsuccessfully attempting to access the resource through the link or by receiving notice from another user that the link is invalid. Likewise, a site administrator typically learns of links to objectionable material by discovering the links himself or by hearing from a concerned user.

SUMMARY

In one aspect, the invention features a computer-implemented method of gathering information about a site of resources in a computer system. A first one of the resources is retrieved from the site, and information about embedded hyperlinks to other resources in the site is extracted from the first resource. Meta-data describing aspects of the first resource and the other resources also is extracted from the first resource. The information about the hyperlinks and the meta-data then is stored in a self-contained map of the site in a persistent data store.

Embodiments of the invention may include the following features. The first resource may be an HTML page. The meta-data may be presented in a graphical representation as a tree with the meta-data describing aspects of the first resource as a root of the tree. The method may include the steps of attempting to access the other resources and, when a resource is accessed, extracting from the accessed resource information about hyperlinks from the accessed resource to other resources in the site and meta-data describing aspects of the accessed resource and the other resources. The step of extracting meta-data may include extracting text data characterizing the resources, and it may include extracting data identifying the types of the resources. The hyperlinks may include hyperlinks to non-hardware components of the computer system, and they may include hyperlinks to HTML pages, video files, audio files, image files, and internet application services. The application services may include electronic mail services, FTP, gopher, news, telnet, and WAIS. Extracting information about hyperlinks may include extracting from the first resource embedded URLs specifying the locations of the other resources.

Data may be stored to indicate which of the other resources is stored on the same computer as the first resource, to indicate whether two of the hyperlinks link the first resource to a single resource, and to indicate the accessibility of each of the other resources. The persistent data store containing the information about the hyperlinks and the meta-data itself may be a resource having a URL. The information stored in the persistent data store may be retrieved across an inter-computer connection, such as the Internet. The computer system may include multiple interconnected computers.

The self-contained persistent data store may be a data structure having a table that stores a URL for the first resource and the other resources, a data object corresponding to each of the resources that stores the meta-data describing aspects of the corresponding resource, and a data object corresponding to each hyperlink embedded in the first resource that links the data object corresponding to the first resource to the data object corresponding to one of the other resources. The data object corresponding to each hyperlink also may include meta-data describing an aspect of the hyperlink.

In another aspect, the invention features a computer program, residing on a computer-readable storage medium, comprising instructions for causing a computer in a computer system to retrieve a first resource in a collection of resources in the computer system, extract from the first resource information about embedded hyperlinks to other resources in the collection, extract from the first resource meta-data describing aspects of the first resource and the other resources, and store in a self-contained persistent data store the information about the hyperlinks and the meta-data.

In another aspect, the invention features a method of obtaining information about the hyperlink structure of a collection of resources in a computer system. The computer system first is searched for a resource containing information about the hyperlink structure of the resources. If such a resource is found, the information is retrieved from the resource; otherwise, the information is obtained directly from the resources in the collection. In some embodiments, the step of first searching for a resource containing information about the hyperlink structure may include attempting to retrieve from the collection of resources a URL specifying the location of such a resource.

In another aspect, the invention features a method of preventing a spider from directly accessing resources in a computer system to gather information about the hyperlink structure of the resources by detecting when the spider is attempting to access one of the resources and instructing the spider instead to access another resource containing information about the hyperlink structure of the resources. In some embodiments, the spider may be provided with a URL specifying the location of the resource.

In another aspect, the invention features a method of discovering differences between two collections of resources in a computer system. A self-contained database containing information about the hyperlink structure of the resources and meta-data describing aspects of the resources is generated for each of the collections, and the databases are compared to discover differences between the collections of resources.

In another aspect, the invention features a method of discovering orphaned resources in a collection of resources. A self-contained database containing information about the hyperlink structure of the collection of resources and meta-data describing aspects of the resources is generated, and a definition of resources (e.g., a file structure) intended to be in the collection is acquired from a user. The contents of the database then are compared to the contents of the definition to determine which of the resources intended to be in the collection of resources is not included in the hyperlink structure of the resources.

In another aspect, the invention features a method of presenting to a user information only about resources of a particular type in a larger collection of resources. A database of information about the hyperlink structure of the resources in the collection and meta-data describing aspects of the resources, including information indicating the type of each resource, is gathered. The database then is filtered to identify resources of the particular type. Only information about the hyperlink structure of the resources of the particular type and meta-data describing aspects of these resources is presented to the user.

In another aspect, the invention features a method of enabling a user to navigate to a particular resource in a collection of resources without accessing other resources in the collection. A resource map containing information about the hyperlink structure of the collection of resources and meta-data describing aspects of the resources is built and presented to the user. The user then is allowed to select the particular resource by selecting meta-data corresponding to the particular resource, and the resource is retrieved for the user. In some embodiments, information indicating that the user wants to access the collection of resources is received from the user after the resource map has been built, and then the map is presented to the user.

The invention may be implemented in a computer system containing a single computer or containing multiple computers connected, e.g., by a local or widely distributed network.

Among the advantages provided by the various embodiments of the invention are the following. The hyperlink structure of a site may be presented in a graphical representation that is more meaningful to and readily understood by the user. A user may view the contents of a site off-line, so the amount of time spent on-line, and therefore the cost incurred, by the user may be decreased significantly. A user may jump directly to any resource in a site without traversing the site, and therefore the number of hits on the server maintaining the site may be reduced. A user may gather information about a site several resources or one resource at a time. Broken and unreachable links may be viewed at a glance, so users (e.g., site administrators) may find broken and unreachable links more quickly and with greater ease. Alternative routes to the same resource may be viewed simultaneously. A user may readily identify linked resources that are maintained by different servers. A user may see every resource in a site that contains a link to a particular resource. A user may view the hyperlink structure of resources by site or by theme.

Other features and advantages of the invention will become apparent from the following description and from the claims.

BRIEF DESCRIPTION OF THE DRAWINGS

FIG. 2 is a schematic diagram of a collection of resources, including an HTML "home page."

FIG. 5 is a schematic diagram of a data structure containing information accumulated by the resource mapping tool.

DETAILED DESCRIPTION

Figure 1:
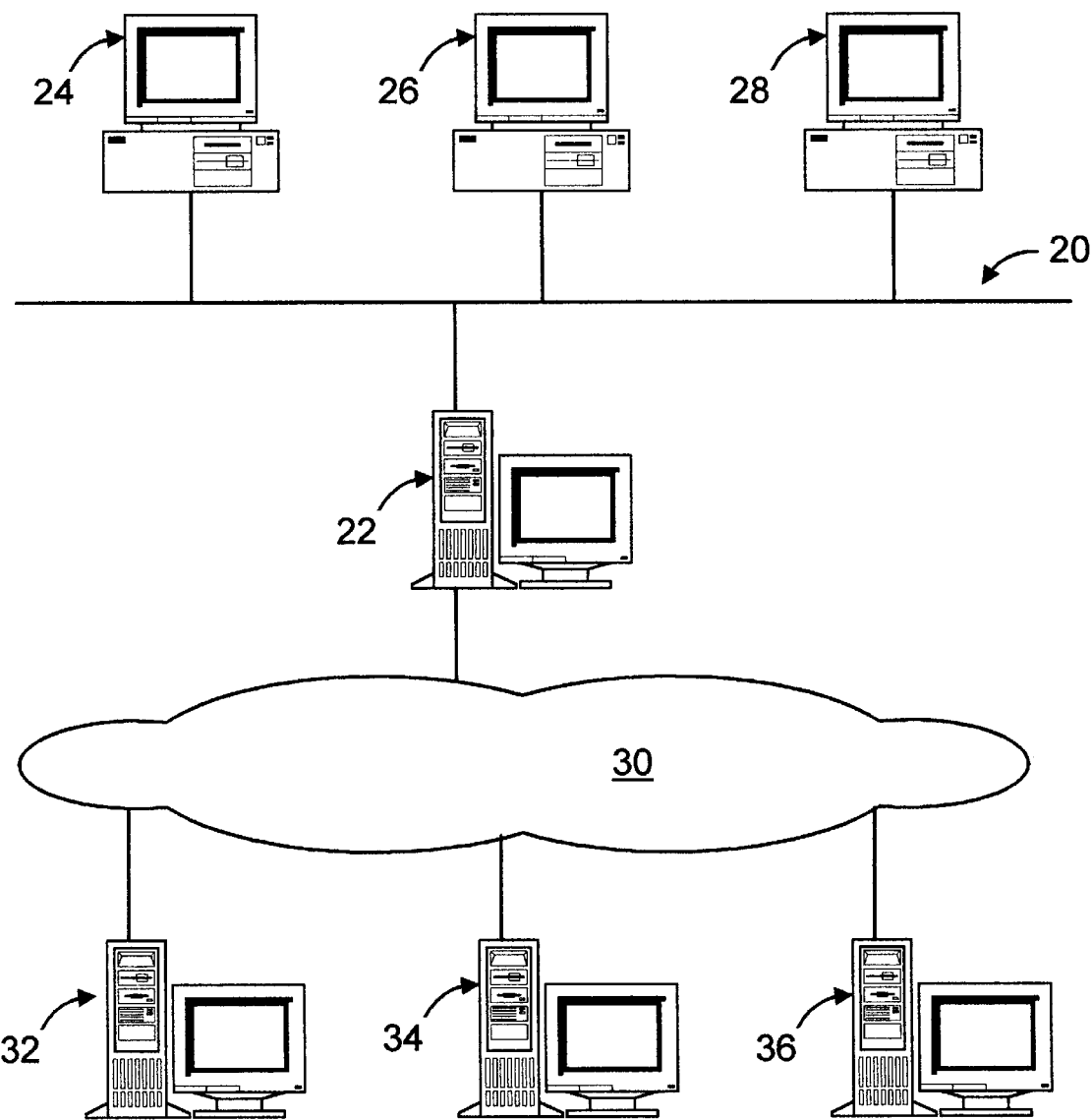
FIG. 1 is a schematic diagram of a computer intranet connected to a computer internet.

Referring to FIGS. 1 and 2, server computer 22 maintains a collection, or site 40, of computer resources accessible by client computers 24, 26, 28 via an intranet 20 and by server computers 32, 34, 36 via the Internet 30. The resources may include executable programs, HTML pages, JPEG and GIF image files, audio files, video files, gateways, and internet service applications, such as electronic mail, FTP, news, gopher, telnet, and WAIS.

Many of the resources in the site 40 contain hyperlinks to other resources in the site 40 or to non-site resources maintained by another server (e.g., server 32). Some of the links may be "nominal" links only and not "actual" links because the resources to which the links point are inaccessible, as described below.

For example, resource 42 is an HTML page that serves as the home page of a corporate Web site ("Corporate Homepage"). Embedded in the corporate home page 42 are links 54, 56, 58 to three resources stored on the same server as the home page: another HTML page 44, an image file 50, and an audio file 52, respectively. The home page 42 also includes an off-site link 66 to an HTML page 68 stored on another server 32. Each of these links is associated with a graphical object in the home page 42. The link 56 to image file 50 is associated with a line image object 76 ("LOGO") that is displayed with the HTML page; the link 54 to HTML page 44 is associated with underlined text object 78 ("products"); the link 58 to audio file 52 is associated with underlined text object 80 ("President"); and the off-site link 66 to page 68 is associated with underlined text object 82 ("Affiliates"). The home page also includes additional links, or alternative routes, to HTML page 44, audio file 52, and HTML page 68, which are associated with underlined text objects 84, 86, 88, respectively.

HTML page 44 likewise includes a link 60 to HTML page 46, which in turn includes a link 62 to HTML page 48. Both HTML page 46 and HTML page 48 are stored on the same server 22 as HTML page 42 and HTML page 44. HTML page 48 contains an off-site link 70 that is not an actual link because it points to a resource 72 that does not exist, has been moved, or currently is inaccessible.

Figure 3:
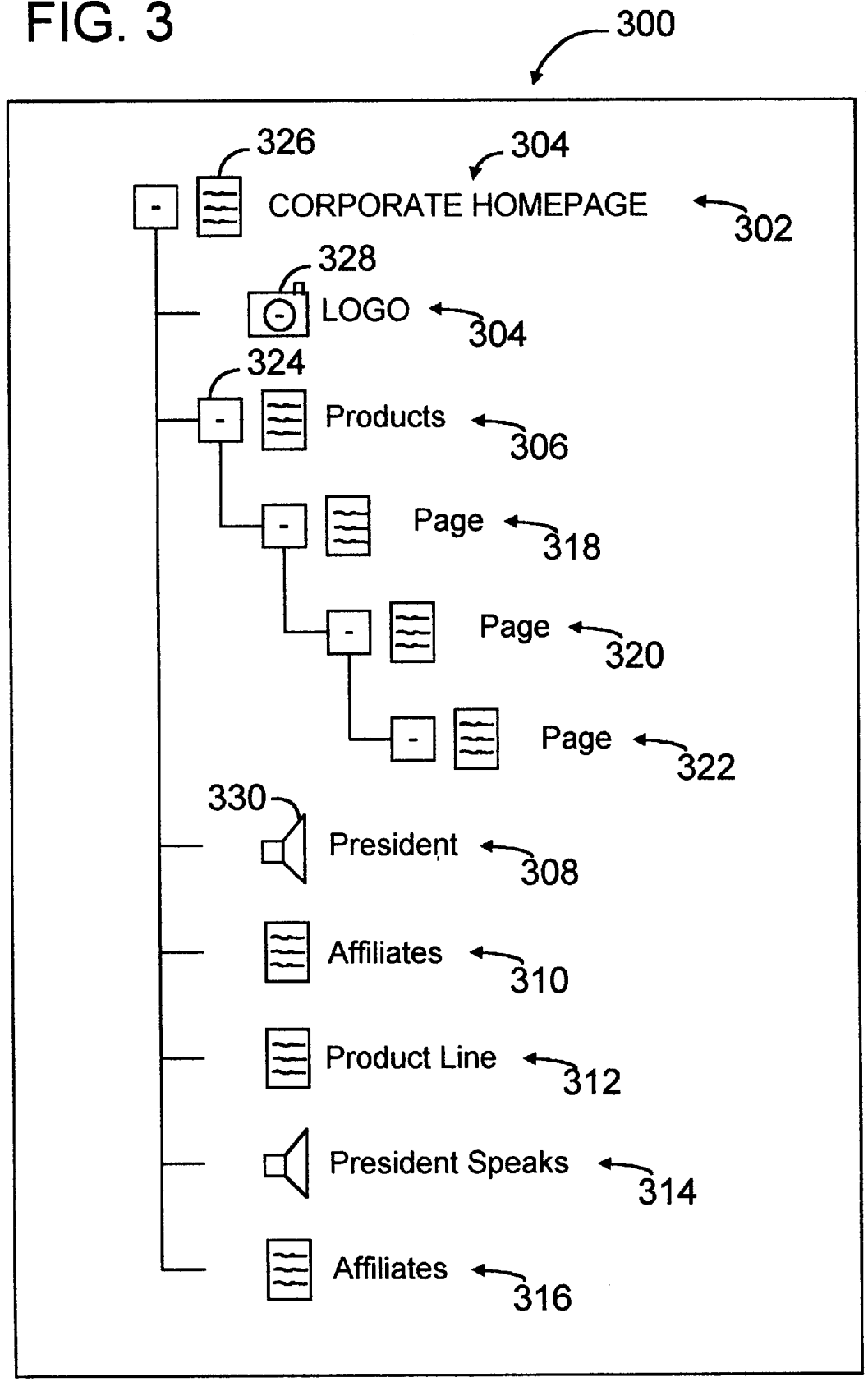
FIG. 3 is a resource map corresponding to the resources shown in FIGS. 1 and 2.

Referring to FIG. 3, a resource map 300 provides a graphical representation of the hyperlink structure of the site 40 in FIG. 2 and information (meta-data) characterizing each of the resources in the site 40. The resource map 300 presents the site 40 as a tree having as its root node 302 the information characterizing the home page 42 ("root resource"). The information characterizing the root resource includes a text string 304 ("Corporate Homepage") representing the title of the home page 42 and an icon 326 indicating the resource type (i.e., HTML page).

The resource map 300 also includes several branch nodes 304–316 extending from and hierarchically subordinate to the root node 302. Each branch node 304–316 represents one of the hyperlinks embedded in the root resource (home page 42). The resource map 300 includes one main route branch node 304, 306, 308, 310 for the links 54, 56, 58, 66 to HTML page 44, image file 50, audio file 52, and HTML page 68, respectively, and one alternative route branch node 312, 314, 316 for the alternative links to HTML page 44, audio file 52, and HTML page 68, respectively. The "main route" represents the first encountered path to a branch node and an "alternative route" represents a subsequently encountered path to the branch node. As with the root node 302, each of the branch nodes 304–316 includes a text string describing the corresponding resource and an icon indicating the resource type. Each HTML page is represented by a "page" icon 326, each image file is represented by a "camera" icon 328, and each audio file is represented by a "speaker" icon 330.

The main route branch node 306 representing HTML page 44 itself includes a branch node 318, which represents the link 60 to HTML page 46. This branch node 306 also includes a branch node 320 representing the link 62 to HTML page 48, which in turn includes a branch node 322 representing the off-site link 70 to HTML page 72.

Each node (e.g., branch node 306) that has branch nodes of its own includes an expansion box 324, which allows the user to expand or collapse the node (i.e., display or hide the branches of the node). When the node is expanded, the expansion box 324 display a "minus" sign, indicating that the node will collapse if the user selects the expansion box 324. When the node is collapsed, the expansion box displays a "plus" sign, indicating that the node will expand if the box 324 is selected. The expansion box 324 displays a question mark ("?") if the corresponding resource has not yet been explored, as described below. Selecting the expansion box 324 when it displays a question mark will cause the corresponding resource to be explored.

The resource map 300 also uses color-coding to provide information about the links represented by the nodes. For example, the text string in a main route branch node is presented in black if the corresponding resource is stored on the same server as the root resource. The text string in a main route branch node is presented in blue if the corresponding resource is located on a different server than the root resource. The text string in an alternative route branch node is presented in green, regardless of where the corresponding resource is located. A text string in a node representing a broken link is presented in red, and a text string in a node representing the most used link in a resource (as described below) is presented in magenta.

Figure 4:
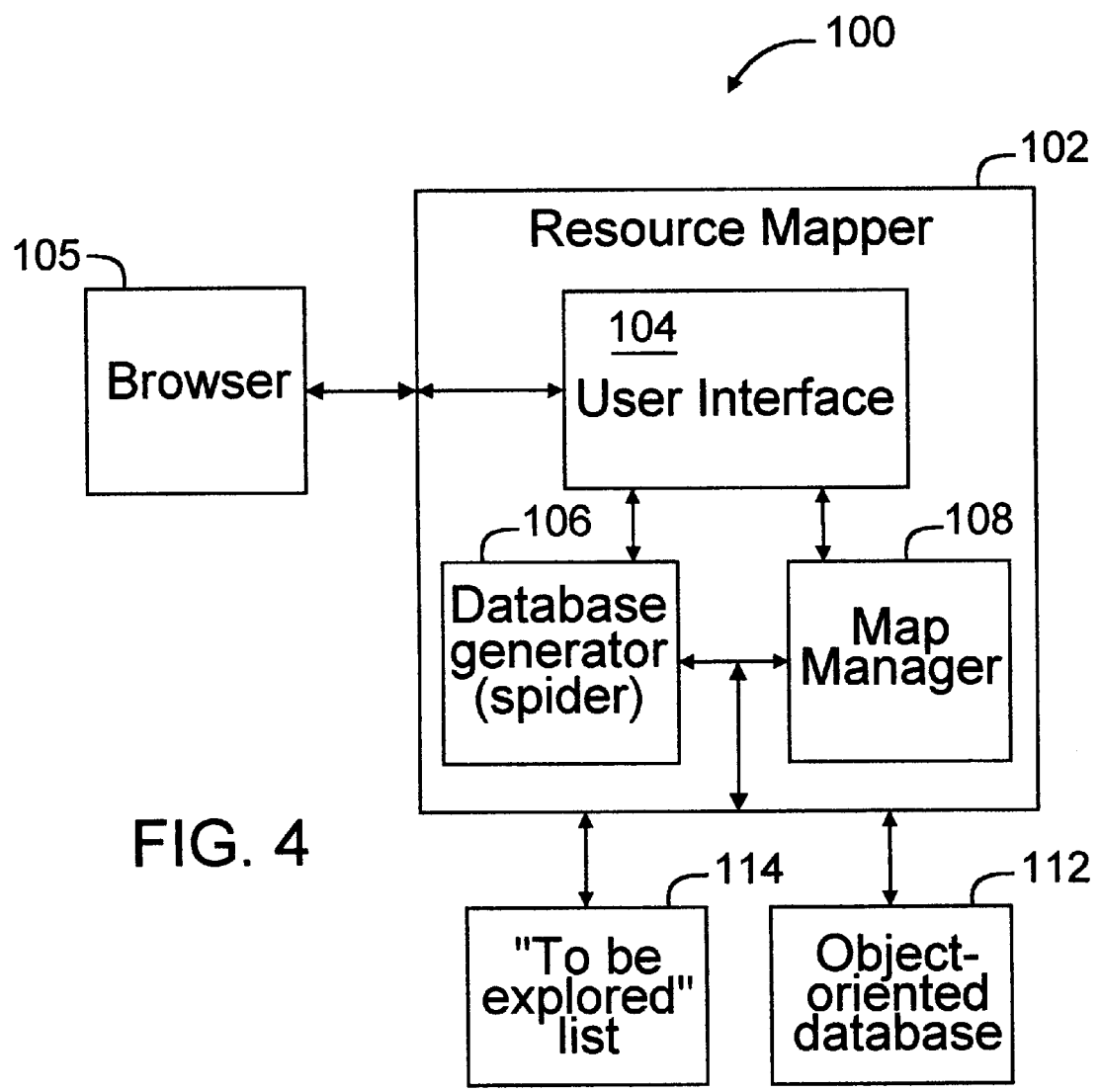
FIG. 4 is a functional block diagram of the components of a resource mapping tool.

Referring to FIG. 4, a resource mapping tool 100 ("resource mapper") is used to create and manage resource maps like the map of FIG. 3. The resource mapper may be implemented as a computer-executable program 102 having several modules.

A user interface module 104 allows the user of a computer to communicate with the mapping tool 100. The user interface module 104 receives from the user information identifying a collection of resources, or "site" (e.g., the URL of the site's home page); it receives from the user parameters to be used in determining which resources to explore in the site, in gathering information from the resources, and in manipulating and presenting that information (e.g., a maximum number of resources to explore, or how many levels (depth) to explore in the hyperlink structure of the site); and it presents to the user a graphical representation of a selected resource map. The user interface module 104 also presents statistics about a selected site to the user, including the URL of the site's home page and a count of resources contained in the resource map for the site.

The user interface module 104 interfaces seamlessly with the Web browser 105, so that when the user selects a resource from a resource map, the resource automatically is retrieved and displayed by the browser 105. The user interface module 104 also invokes the browser 105 automatically and brings it to the display foreground (in a Windows environment) if the browser is not already open and running in the foreground when the user selects a resource.

A database generator module 106 gathers information about the collection of resources, in accordance with the user's instructions, and compiles the information in an object-oriented database 112 that forms the resource map. The database generator module 106 is a spider that uses the hypertext transfer protocol (http) for exploring each resource to gather information (e.g., meta-data) characterizing the resource, to discover other resources by finding hyperlinks in the resource, and to gather information (e.g., meta-data) characterizing the resources identified by the links, if the resources are accessible. The spider maintains a list 114 of resources that it has discovered but has not yet explored. The operation of the database generator module 106 is described below.

A map manager module 108 compares resource maps, including maps of different sites as well as different maps of one site, as described below. The map manager module 108 also allows the user to change resource maps (e.g., change the text displayed in a node of a map) and to search maps for particular information (e.g., resources of a certain type or having a certain characteristic).

Referring to FIG. 5, each resource map is formed by an object-oriented data structure 112 having a URL table 120 and many objects containing data about and preserving the hyperlink structure of the resources in a site. The objects exchange and store information in a way consistent with object-oriented programming. The resource map is a self-contained data structure and is not spread across files in a computer system. The resource map itself may be a resource with a URL.

The URL table 120 stores the Uniform Resource Locator (URL) 122 of each resource in the map and a pointer 124 to a corresponding URL object 126. The URL object 126 provides the full URL 128 of the corresponding resource, or a pointer 130 to the resource's local path if the resource resides in a file system. The URL object 126 also indicates the resource's MIME type 132 and its http status 134 (i.e., an http code indicating whether the resource is accessible or inaccessible) and contains a pointer 136 to a corresponding resource object 140.

Each resource in a mapped site is represented by a corresponding resource object 140, 142, the contents of which are described below. Likewise, every hyperlink between two resources is represented by a corresponding link object 144. Every link object 144 contains two pointers 146, 148: one that points to the resource object 140 for the resource containing the link ("source"), and one that points to the resource object 142 for the resource identified by the link ("target"), respectively. The resource represented by resource object 140 contains a link to the resource represented by resource object 142, so link object 144 points to both resource objects, identifying resource object 140 as the source and resource object 142 as the target. The link object 144 also stores meta-data associated with the link, including usage data 150 determined by calculating how often the link actually is used to jump from the source to the target, the "link" URL 152 (i.e., the URL specified in the link, which usually indicates the location of the target in relation to the location of the source), the hyperlink text 154 (i.e., the text in the source displayed and associated with the link), and the Alt-string 156 associated with the target if the resource is an image.

Each resource object 140, 142 stores structural information indicating the role of the resource in the structure of the site and meta-data information describing characteristics of the resource. Because a resource map provides a color-coded, tree-like representation of a site's structure, as described above, each resource object indicates which links to and from the corresponding resource lie along the tree's main route and which links lie along alternative routes. The resource object 140 maintains a list of in-link objects 160, which stores a pointer to every link object identifying the resource object 140 as its source. The resource object 140 also maintains a list of out-link objects 162, which stores a pointer to every link object identifying resource object 140 as its target. The list of out-link objects 162 is divided into a "main routes" list 164 and an "alternative routes" list 166, which indicate the main route links and the alternative route links, respectively, to resource object 140. As described above, the "main route" represents the first discovered path to a resource, and an "alternative route" represents a subsequently discovered path to the resource. A "parent object" pointer 168 identifies which resource object contains resource object 140 in its main routes list. The resource object identified by the parent object pointer 168 is the parent resource of the resource represented by resource object 140. A "most used out-link" pointer 170 indicates which link identified in the main routes list 164 is used most often to jump from the source to the corresponding target (i.e., which link object in the main routes list 164 has the highest value in its usage data field 150).

Each resource object 140, 142 also includes a meta-data table 172 that stores meta-data describing the corresponding resource. Types of meta-data gathered and stored in the meta-data table 172 include the name of the owner of the resource, the owner's electronic mail address, modification date, resource size, the date on which the next version is due to be released, the source path, and any notes that may be attached to the resource. Each resource object 140, 142 also includes a state indicator 176 that indicates whether the resource has been discovered only, has been verified, or has been fully explored.

Each resource type has a corresponding template object. When the spider encounters a resource, it instantiates the appropriate template for the resource type to create the resource object (e.g., resource object 140). Inherited by the resource object instance is an explore method 174 appropriate to the resource type. The explore method 174 may be invoked by the spider to cause the resource object to explore the corresponding resource, as described below.

Figure 6A:
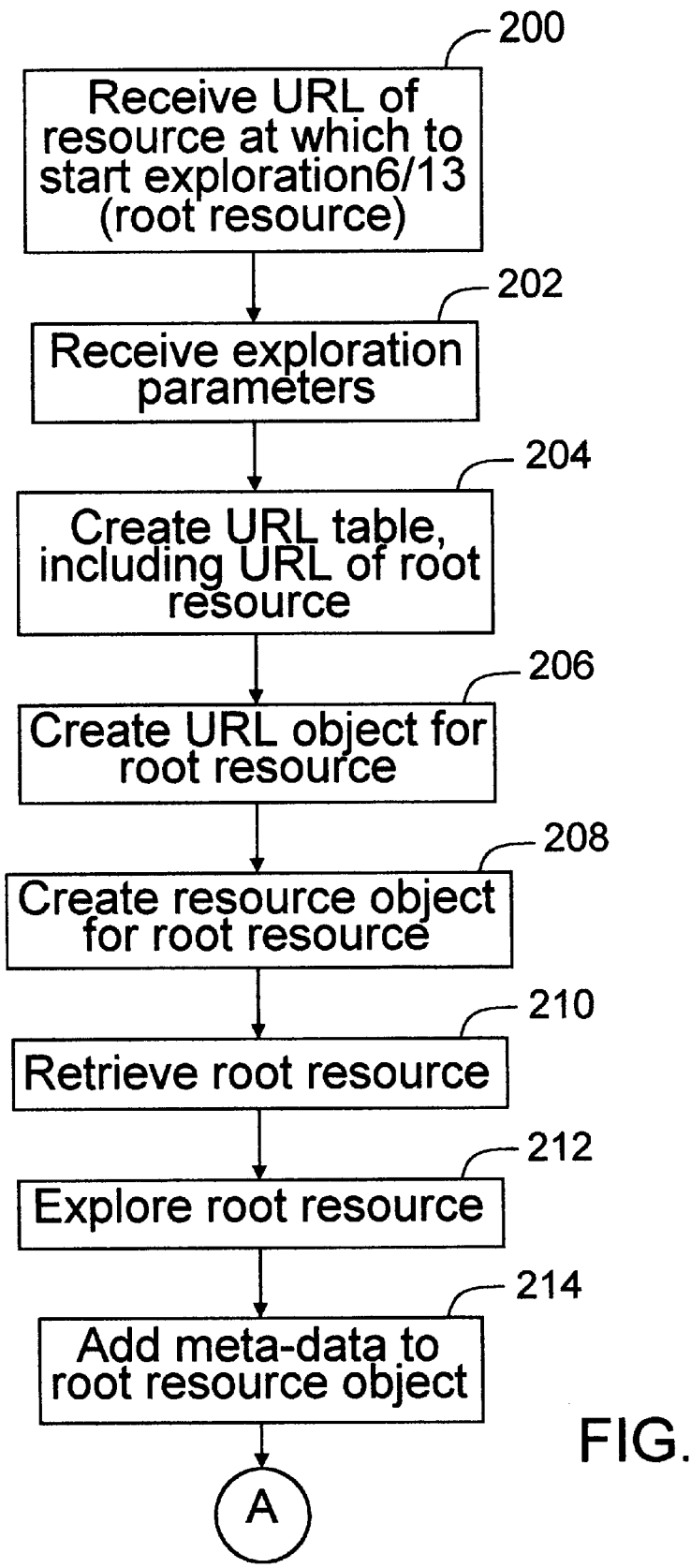
FIGS. 6A, 6B, 6C, 7, and 8 are flow diagrams of methods by which the resource mapping tool gathers information and stores it in the data structure.
Figure 6B:
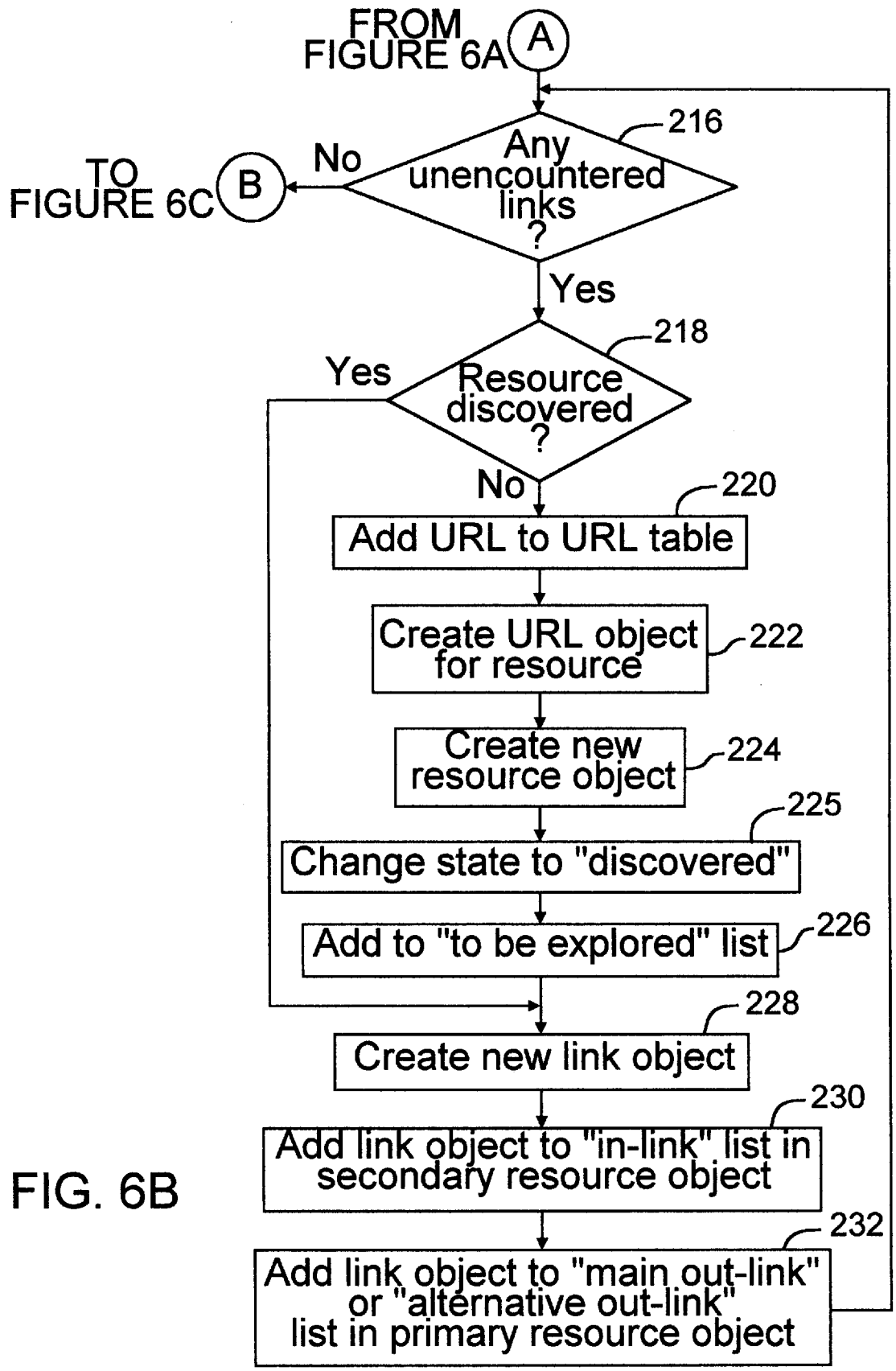
Figure 6C:
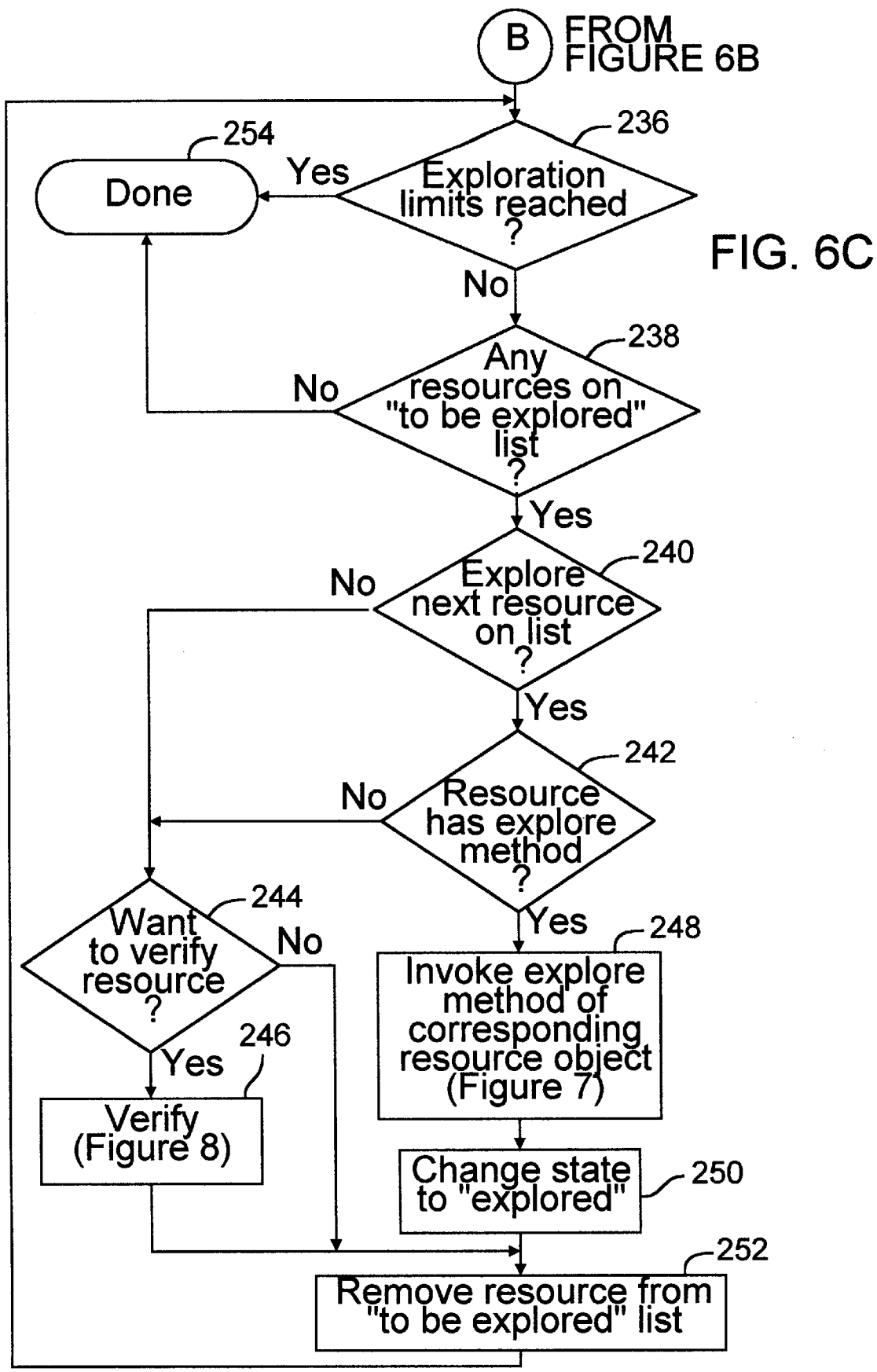

Referring to FIGS. 6A through 6C, the resource mapper begins building a resource map by using the spider module to receive the URL of the resource (the "root" resource) at which to start exploration and exploration parameters from the user interface (steps 200, 202). The spider then creates a URL table 204 in the object-oriented database (step 204), adding the URL for the root resource, and creates a URL object and a resource object for the root resource (steps 206, 208). The root resource then is retrieved in full from the server maintaining the resource (step 210) and explored by the spider (step 212). As the spider explores the resource, the spider retrieves meta-data and adds it to the meta-data table in the resource object (step 214).

When the spider discovers an unencountered link (i.e., a hyperlink that the spider had not previously discovered) in the root resource (step 216), it determines whether the resource identified by the link has been discovered (step 218). If not, the URL of the newly discovered resource is added to the URL table (step 220), and corresponding URL and resource objects are created (steps 222, 224). The state indicator then is set to "discovered" (step 225), and the resource is added to the "to be explored" list (step 226). After the resource has been added to the list, or if the resource already had been discovered, a link object is created for the link (step 228). The link object then is added to the "in-link" list in the target object and to the either the "main routes" list or the "alternative routes" list in the source object (steps 230, 232). The spider continues in this manner until no unencountered links remain in the root resource.

When the spider has finished exploring the root resource, it determines whether the user-defined exploration limits have been reached (step 236) and, if not, whether any resources remain on the "to be explored" list (step 238). If the list identifies a resource, the spider determines whether the resource can be explored (step 240) and if the corresponding resource object contains an explore method for the resource (step 242). If the answer to either query is "no," the spider determines whether the resource should be verified (step 244) and, if so, attempts to verify the resource (step 246), as described below. If an explore method is associated with the resource, the spider invokes the explore method (step 248), as described below, and changes the state indicator in the corresponding resource object to "explored" (step 250). The resource then is removed from the "to be explored" list (step 252), regardless of whether the resource was explored, verified, or even bypassed altogether. The spider continues in this manner until the exploration limits are reached or until all resources have been removed from the "to be explored" list (step 254).

Figure 7:
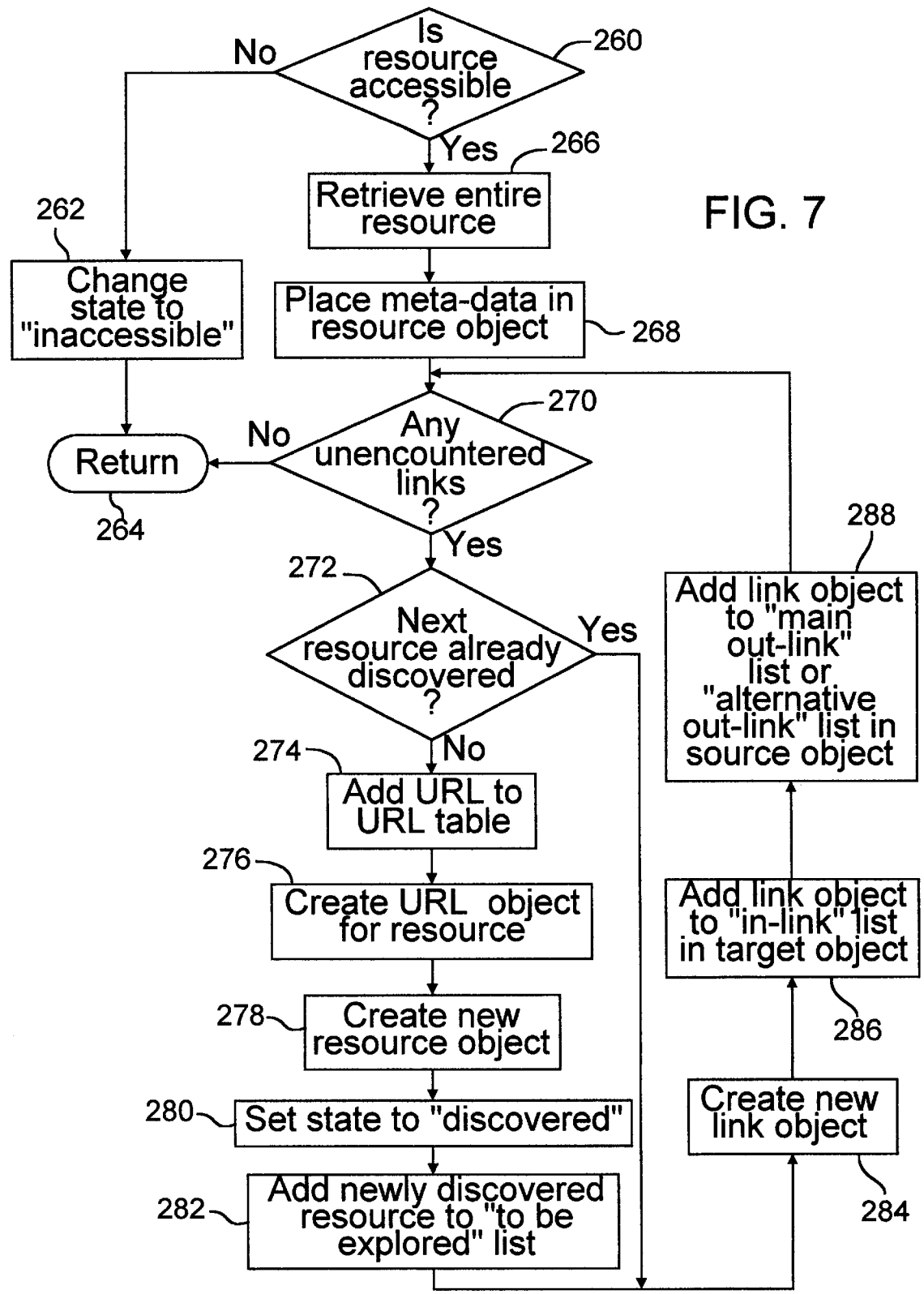

Referring to FIG. 7, each explore method, when invoked, first determines whether the corresponding resource is accessible (step 260). If not, the method changes the state indicator in the resource object to "inaccessible" (step 262) and moves on to explore other resources (step 264). If the resource is accessible, the resource is retrieved in full and explored (step 266). Meta-data describing the resource is placed in the meta-data table of the corresponding resource object (step 268). When an unencountered link is discovered (step 270), the explore method determines whether the resource identified by the link already has been discovered (step 272). If not, the URL of the resource is added to the URL table (step 274), and corresponding URL and resource objects are created (steps 276, 278). The corresponding state indicator then is set to "discovered" (step 280) and the resource is added to the "to be explored" list (step 282).

After the resource is added to the list, or if the resource already had been discovered, a new link object is created (step 284). The link object then is added to the "in-link" list in the target object and to either the "main routes" list or the "alternative routes" list in the source object (steps 286, 288). The method continues exploring the resource until no unencountered links remain in the resource.

Figure 8:
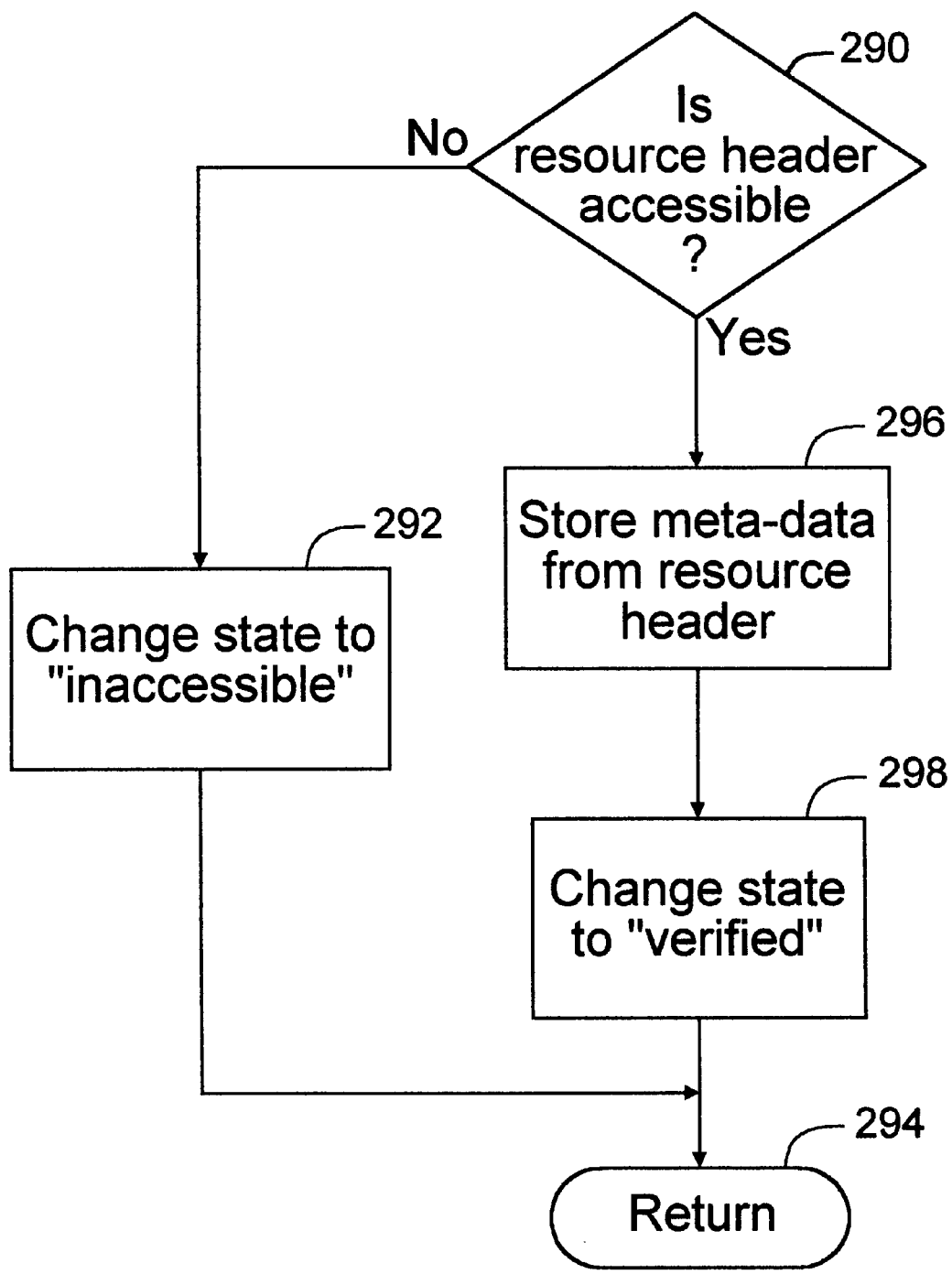

Referring now to FIG. 8, when a resource is to be verified only, the spider first determines whether the resource header is accessible (step 290). If not, the corresponding state indicator is changed to "inaccessible" (step 292) and the spider moves on to explore other resources (step 294). If the header is accessible, the spider places the meta-data contained in the header into the corresponding meta-data table (step 296) and changes the state indicator to "verified" (step 298) before moving on to explore other resources (step 294).

Figure 9:
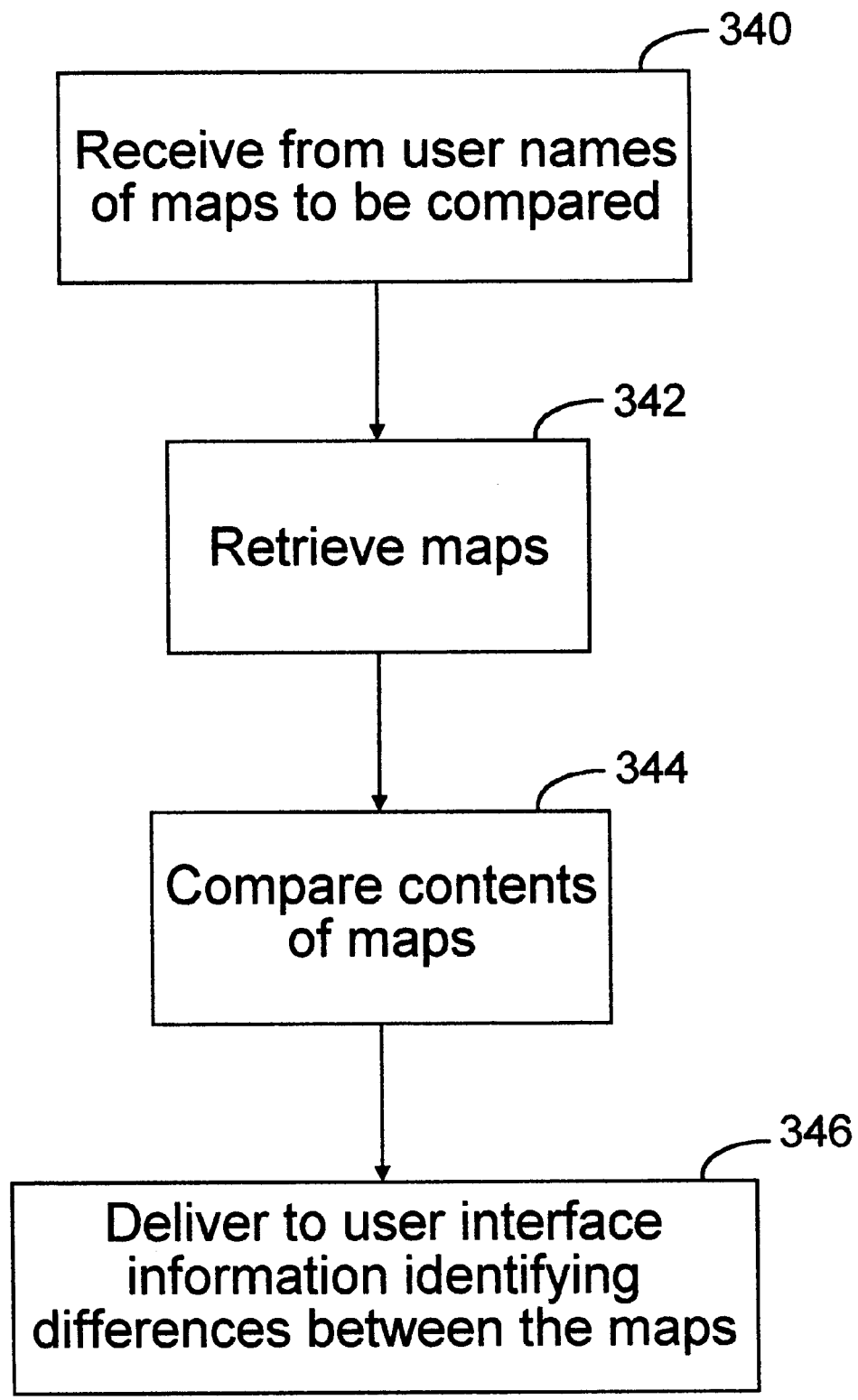
FIG. 9 is a flow diagram for comparing two resource maps.

Referring to FIG. 9 and again to FIG. 4, the map manager module 108 compares resource maps of two different sites to identify differences between the sites. The module also compares two different maps of the same site to identify, e.g., how the site has changed over time, and compares a resource map of a site with a list of resources (e.g., a file structure) thought to be in the site to identify "orphaned" resources (e.g., resources in a file system that are not linked to any other resources). The map manager module 108 first receives from the user interface module 104 the names of the maps (or the map and the resource list) to be compared (step 340). The map manager 108 then retrieves the maps (step 342) and compares the contents of the maps (step 344). If any differences (e.g., missing resources or resources for which the http status has changed) are found, the map manager 108 delivers information characterizing the differences to the user interface 104 for display to the user (step 346). Optionally, the map manager 108 may compare and report on differences in other meta-data recorded in the maps.

Figure 10:
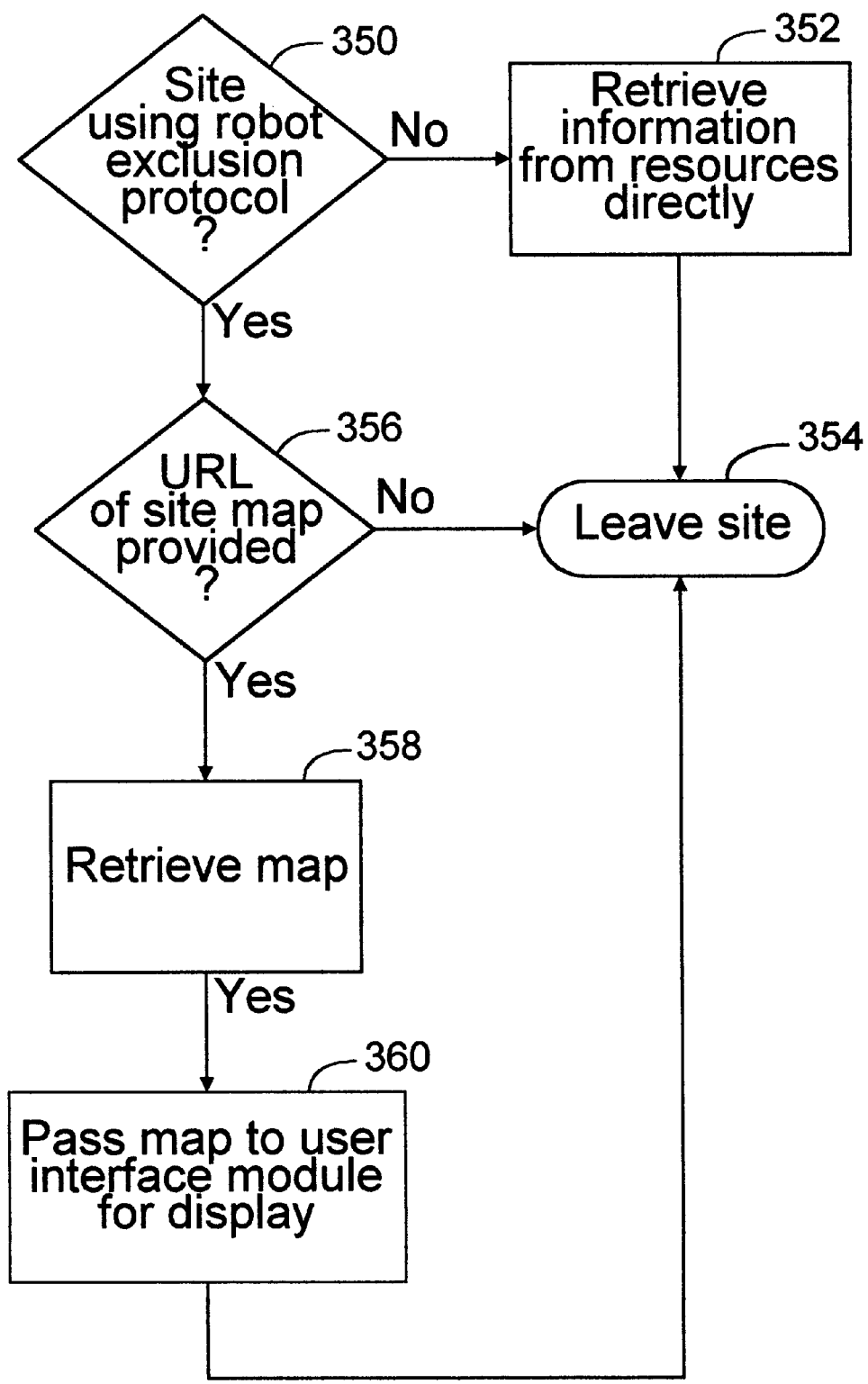
FIG. 10 is a flow diagram for honoring the robot exclusion protocol.

Referring to FIG. 10, the spider used in the resource mapper honors the robot exclusion protocol. This protocol was developed to allow site administrators to prevent spiders, or robots, from accessing resources in a site. The protocol calls for the site administrator to store in the server maintaining the site a file ("/robots.txt") that indicates which resources should not be accessed by spiders. With the resource mapper, instead of simply instructing spiders not to crawl on a site, the site administrator may provide the URL of a resource map of the site and instruct the spiders to retrieve the site map.

When the spider used in the resource mapper first accesses a site, it determines whether the site is using the robot exclusion protocol (step 350). If not, the spider retrieves information about resources in the site from the resources directly (step 352) and then leaves the site (step 354). If the site is using the exclusion protocol, the spider determines whether the URL of a site map is provided (step 356). If not, the spider leaves the site (step 354) without gathering information about the resources in the site. But if the server maintaining the site does provide the URL of a site map, the spider retrieves the map (step 358) and provides it to the user interface module for display to the user (step 360). The spider then leaves the site without accessing any other resources directly (step 354).

The invention may be implemented in digital electronic circuitry or in computer hardware, firmware, software, or in combinations of them. Apparatus of the invention may be implemented in a computer program product tangibly embodied in a machine-readable storage device for execution by a computer processor; and method steps of the invention may be performed by a computer processor executing instructions organized into program modules to perform functions of the invention by operating on input data and generating output. Suitable processors include, by way of example, both general and special purpose microprocessors. Generally, a processor will receive instructions and data from a read-only memory and/or a random access memory. Storage devices suitable for tangibly embodying computer program instructions include all forms of non-volatile memory, including, e.g., semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

Figure 11:
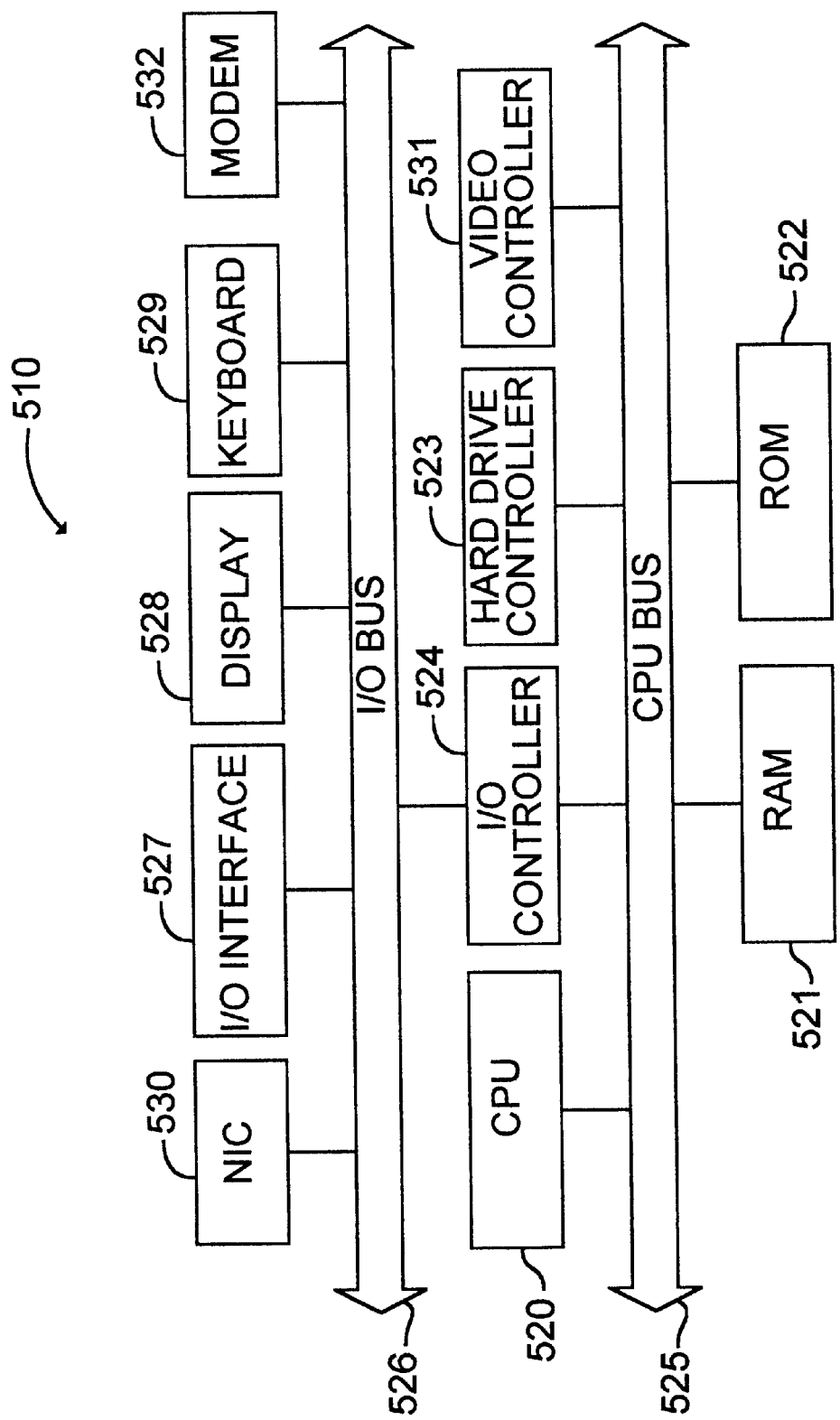
FIG. 11 is a functional block diagram of a computer system suitable for implementing the resource mapping tool.

FIG. 11 shows a block diagram of a programmable processing system (system) 510 suitable for implementing or performing the apparatus or methods of the invention. The system 510 includes a processor 520, a random access memory (RAM) 521, a program memory 522 (for example, a writable read-only memory (ROM) such as a flash ROM), a hard drive controller 523, a video controller 531, and an input/output (I/O) controller 524 coupled by a processor (CPU) bus 525. The system 510 may be preprogrammed, in ROM, for example, or it may be programmed (and reprogrammed) by loading a program from another source (for example, from a floppy disk, a CD-ROM, or another computer).

The hard drive controller 523 is coupled to a hard disk suitable for storing executable computer programs, including programs embodying the present invention, and data. The video controller 531 is coupled to a video recorder, which may be used for storing and importing video footage and for writing final output. The I/O controller 524 is coupled by means of an I/O bus 526 to an I/O interface 527. The I/O interface 527 receives and transmits data (e.g., stills, pictures, movies, and animations for importing into a composition) in analog or digital form over communication links such as a serial link, local area network, wireless link, and parallel link. Also coupled to the I/O bus 526 is a display 528, a keyboard 529, a network interface card (NIC) 530, and a modem 532 for connecting, e.g., to an Internet service provider (ISP) or an on-line service provider (OSP). Alternatively, separate connections (separate buses) may be used for the I/O interface 527, display 528 and keyboard 529.

Other embodiments are within the scope of the following claims. For example, computer networks 20 and 30 in FIG. 1 may be a Local Area Network (LAN) and a Wide Area Network (WAN), respectively, that together form a computer intranet. A resource map, when stored for later use or transmitted to a spider, may take the form of a database object, a structured file of text, or any other convenient format.

What is claimed is:

1. A computer-implemented method of gathering information about a site of resources in a computer system, the method comprising:

retrieving a first one of the resources from the site;

extracting from the first resource information about embedded hyperlinks to other resources in the site;

extracting from the first resource meta-data describing aspects of the first resource and the other resources; and storing in a self-contained persistent data store the information about the hyperlinks and the meta-data.

2. The method of claim 1 wherein the first resource comprises an HTML page.

3. The method of claim 1 further comprising presenting the meta-data in a graphical representation as a tree with the meta-data describing aspects of the first resource as a root of the tree.

4. The method of claim 3 wherein each of the meta-data describing aspects of the other resources are presented as a branch of the tree.

5. The method of claim 4 wherein presenting the branch includes indicating to the user whether the branch represents the first or subsequent encountered path to the other resource.

6. The method of claim 4 wherein presenting one or more branches includes indicating to the user that a particular branch is the most used.

7. The method of claim 1 further comprising:
attempting to access the other resources; and
when a resource is accessed, extracting from the accessed resource information about hyperlinks from the accessed resource to other resources in the site and meta-data describing aspects of the accessed resource and the other resources.

8. The method of claim 1 wherein the step of extracting meta-data includes extracting text data characterizing the resources.

9. The method of claim 1 wherein the step of extracting meta-data includes extracting data identifying the types of the resources.

10. The method of claim 1 wherein the step of extracting information about hyperlinks includes extracting information about hyperlinks to non-hardware components of the computer system.

11. The method of claim 1 wherein the step of extracting information about hyperlinks includes extracting information about hyperlinks to resources selected from the group consisting of HTML pages, video files, audio files, image files, and internet application services.

12. The method of claim 11 wherein the internet application services include services selected from the group consisting of electronic mail services, FTP, gopher, news, telnet, and WAIS.

13. The method of claim 1 wherein the step of extracting information about hyperlinks includes extracting from the first resource embedded URLs specifying the locations of the other resources.

14. The method of claim 1 further comprising storing data indicating which of the other resources is stored on the same computer as the first resource.

15. The method of claim 1 further comprising storing data indicating whether two of the hyperlinks link the first resource to a single resource.

16. The method of claim 1 further comprising storing data indicating the accessibility of each of the other resources.

17. The method of claim 1 wherein the step of storing the information about the hyperlinks and the meta-data in a persistent data store comprises storing the information and meta-data in a resource having a URL.

18. The method of claim 1 wherein the steps of extracting include retrieving information across an inter-computer connection.

19. The method of claim 18 wherein the connection comprises the Internet.

20. The method of claim 1 wherein the computer system comprises a plurality of interconnected computers.

21. The method of claim 1 wherein storing the information about the hyperlinks and the meta-data in a self-contained persistent data store includes storing the information and meta-data in a data structure comprising:
a table that stores a URL for the first resource and the other resources;
a data object corresponding to each of the resources that stores the meta-data describing aspects of the corresponding resource; and
a data object corresponding to each hyperlink embedded in the first resource that links the data object corresponding to the first resource to the data object corresponding to one of the other resources.

22. The method of claim 21 wherein the data object corresponding to each hyperlink also includes meta-data describing an aspect of the hyperlink.

23. A computer program, residing on a computer-readable storage medium, comprising instructions for causing a computer in a computer system to:
retrieve a first resource in a collection of resources in the computer system;
extract from the first resource information about embedded hyperlinks to other resources in the collection;
extract from the first resource meta-data describing aspects of the first resource and the other resources; and
store in a self-contained persistent data store the information about the hyperlinks and the meta-data.

24. The method of claim 23 further comprising receiving from a user information identifying the first resource from which to gather information about the collection of resources.

25. A method of obtaining information about the hyperlink structure of a collection of resources in a computer system, the method comprising:
first searching the computer system for a resource containing information about the hyperlink structure of the resources,
obtaining the information from the resource if such a resource is found, and
otherwise obtaining the information directly from the resources in the collection.

26. The method of claim 21 wherein the step of first searching for a resource containing information about the hyperlink structure comprises attempting to retrieve from the collection of resources a URL specifying the location of such a resource.

27. A method of preventing a spider from directly accessing resources in a computer system to gather information about the hyperlink structure of the resources, the method comprising:
detecting when the spider is attempting to access one of the resources, and
instructing the spider instead to access another resource containing information about the hyperlink structure of the resources.

28. The method of claim 23 wherein the step of instructing the spider to access another resource comprises providing the spider with a URL specifying the location of the resource.

29. A method of discovering differences between two collections of resources in a computer system, the method comprising:
generating for each collection a self-contained database containing information about the hyperlink structure of the resources and meta-data describing aspects of the resources, and
comparing the databases to discover differences between the collections of resources.

30. A method of discovering orphaned resources in a collection of resources, the method comprising:
generating a self-contained database containing information about the hyperlink structure of the collection of resources and meta-data describing aspects of the resources, acquiring from a user a definition of resources intended to be in the collection, and comparing the contents of the database to the contents of the list to determine which of the resources intended to be in the collection of resources is not included in the hyperlink structure of the resources.

31. The method of claim 30 wherein acquiring a definition of resources comprises acquiring a file structure.

32. A method of presenting to a user information only about resources of a particular type in a larger collection of resources, the method comprising:

gathering a database of information about the hyperlink structure of the resources in the collection and meta-data describing aspects of the resources, including information indicating the type of each resource, filtering the database to identify resources of the particular type, and presenting to the user only information about the hyperlink structure of the resources of the particular type and meta-data describing aspects of these resources.

33. A method of enabling a user to navigate to a particular resource in a collection of resources without accessing other resources in the collection, the method comprising:

building a resource map containing information about the hyperlink structure of the collection of resources and meta-data describing aspects of the resources, presenting the resource map to the user, and allowing the user to select the particular resource by selecting meta-data corresponding to the particular resource and retrieving the resource for the user.

34. The method of claim 33 further comprising:

after the step of building a resource map has occurred, receiving from the user information indicating that the user wants to access the collection of resources, and thereafter presenting the map to the user and allowing the user to select the particular resource.

35. The method of claim 33 wherein the step of presenting the resource map to the user includes indicating to the user that the particular resource contains a broken hyperlink to another resource.

36. The method of claim 1 further comprising receiving from a user information identifying the first one of the resources from which to gather information about the site of resources.

37. The method of claim 33 further comprising:

after the step of building a resource map has occurred, receiving from the user information indicating that the user wants to update information about the collection of resources, and thereafter presenting the map to the user and allowing the user to update the information about the hyperlink structure and the meta-data describing aspects of a particular resource.

* * * * *

UNITED STATES PATENT AND TRADEMARK OFFICE
CERTIFICATE OF CORRECTION

PATENT NO. : 5,935,210  
DATED : August 10, 1999  
INVENTOR(S) : Stark

Page 1 of 1

It is certified that error appears in the above-identified patent and that said Letters Patent is hereby corrected as shown below:

Title Page,
Line 4, Applying Open Hypertext Principles, should read Applying Open Hypertext Principles Column 12,
Line 34, error reads claim 21, should read claim 25
Line 48, error reads claim 23, should read claim 27

Signed and Sealed this

Twenty-first Day of August, 2001

*Attest:*

NICHOLAS P. GODICI
*Attesting Officer*  Acting Director of the United States Patent and Trademark Office